United States Patent [19]

Hsu

[11] Patent Number: 4,889,544
[45] Date of Patent: Dec. 26, 1989

[54] COOLER-DEHUMIDIFIER-FILTER 3-IN-ONE APPARATUS FOR TREATING COMPRESSED AIR

[76] Inventor: Chia-Tsong Hsu, No. 424-2, Sec. 1, Chungshan Road, Changhua, Taiwan

[21] Appl. No.: 294,672

[22] Filed: Jan. 9, 1989

[51] Int. Cl.⁴ .............................................. B01D 45/16
[52] U.S. Cl. ........................................ 55/218; 53/268; 53/269; 53/320; 53/337; 53/398
[58] Field of Search .................. 55/165, 169, 218, 219, 55/268, 269, 319, 320, 337, 398, 431

[56] References Cited

U.S. PATENT DOCUMENTS 4,052,178  10/1977  Franz ................................. 55/337 X
4,692,175  9/1987  Franz ..................................... 55/218

Primary Examiner—Charles Hart
Attorney, Agent, or Firm—Bacon & Thomas

[57] ABSTRACT

A cooler-dehumidifier-filter 3-in-one apparatus for treating compressed air, comprising an air inlet-outlet mechanism with a built-up radiator cisterns connected therebelow, having an air diffusion mechanism and an air filtering mechanism set therein to communicate with the air intake conduit so as to provide initial cooling and filtering effect; an exhausting device being made on the bottom of said air filtering mechanism to produce spiral air flow so as to dehumidfy the compressed air; the dehumidified air being to soar upward to pass through said filtering mechanism and the interlocking holes of the flange of said air diffusion mechanism to further be squeezed and diffused to cool down again; said air current being further to pass through said upwardly disposed filtering cylinder for secondary filtration; a water cooling effect being achieved by means of the arrangement of water inlet and outlet on said radiator cisterns to match the communicating pipe formed by the vertical conduits of said radiator cisterns.

4 Claims, 5 Drawing Sheets

4,889,544

COOLER-DEHUMIDIFIER-FILTER 3-IN-ONE APPARATUS FOR TREATING COMPRESSED AIR

BACKGROUND OF THE INVENTION

The present invention is related to an integrated apparatus to concomitantly cool, dry and filtrate compressed air.

In industry, when to cool, dry and filtrate compressed air, it is normally to induce the compressed air to flow through a cooling apparatus, a drying apparatus and a filtering apparatus to let the compressed air be cooled, dried and filtrated step by step. Although the compressed air can be well treated through said step-by-step operation, said three independent systems of apparatus are heavy and require a big space to install, of which the assembly is more complicated and the cost is very expensive.

In view of said problem, a 3-in-one apparatus of the present invention is thus created to provide multiple functions to cool, dry, and filtrate compressed air concomitantly.

SUMMARY OF THE INVENTION

The main object of the present invention is to provide a cooler-dehumidifier filter 3-in-one apparatus for treating compressed air to achieve an initial cooling and filtering effect by means of an air diffusion mechanism and an air filtering mechanism in a radiator cisterns assembly; to achieve an air dehumidifying effect by means of a spiral air blow formation through a device arranged on the bottom of said filtering mechanism; to achieve a secondarily cooling effect by means of the arrangement of interlocking holes made on outer flanges of said air diffusion mechanism and said air filtering mechanism; and to achieve the whole cooling, dehumidifying and filtering process by means of the arrangement of a fine filtering cylinder.

Another object of the present invention is to provide a cooler-dehumidifier-filter 3-in-one apparatus for treating compressed air wherein said radiator cisterns, air diffusion mechanism and air filtering mechanism are built up with respective elements by means of series connection such that the size of the apparatus may be flexibly set up according to requirements so as to practically provide high performance in cooling, dehumidifying and filtering process.

A yet further object of the present invention is to provide a cooler-dehumidifier-filter 3-in-one apparatus for treating compressed air wherein said water inlet and said water outlet of said first top radiator cistern may be pierced for filling of cooling water through said water inlet and for draining of the cooling water through said water outlet via the communicating pipe formed by said vertical conduits so as to provide water cooling effect.

BRIEF DESCRIPTION OF THE DRAWING

The foregoing and other objects, features and advantages of the present invention will be best understood from the following description, the appended claims and the accompanying drawings in which:

DETAILED DESCRIPTION

Figure 1:
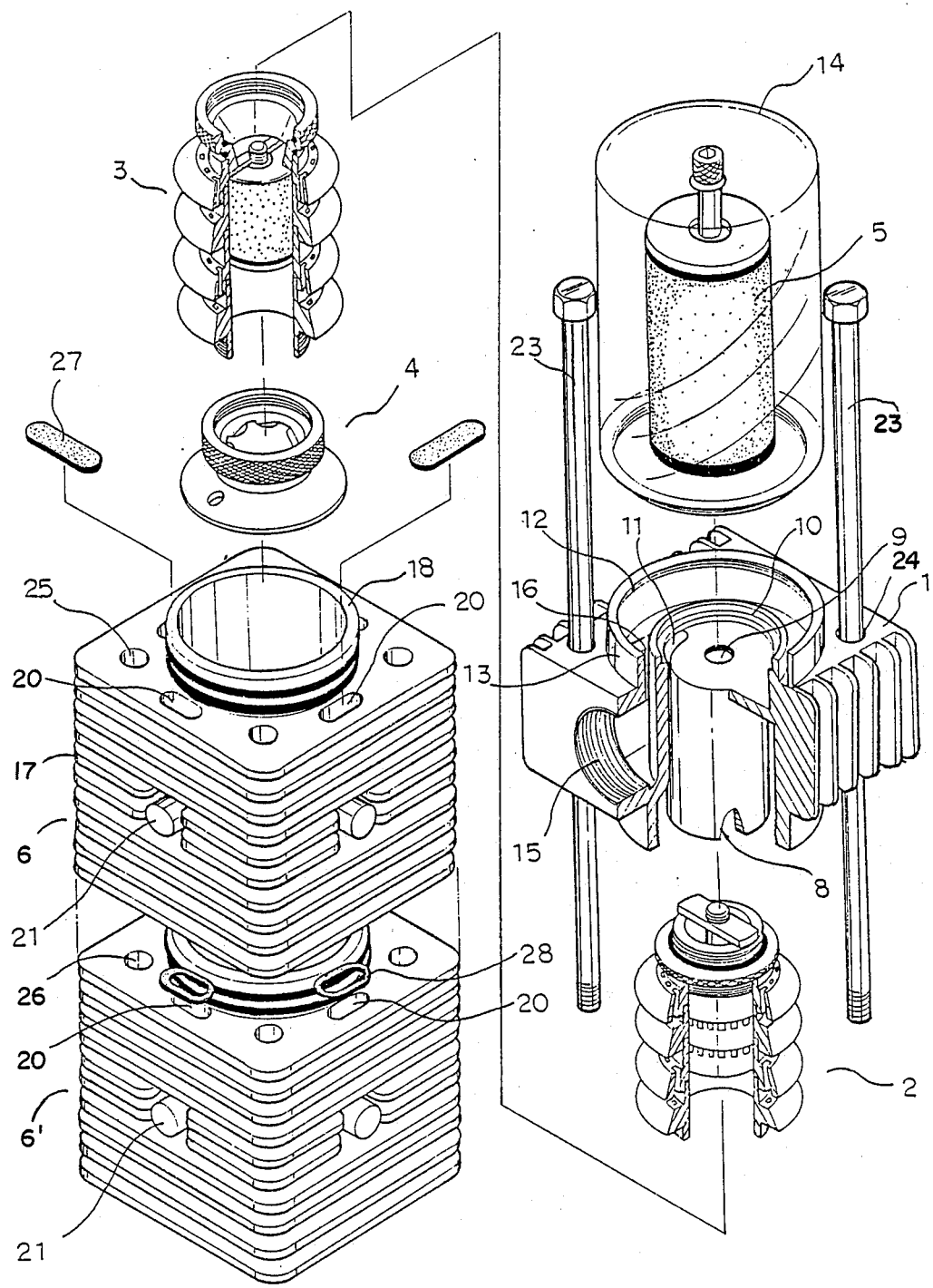
FIG. 1 is a fragmentary perspective view of apparatus embodying the present invention.
Figure 2:
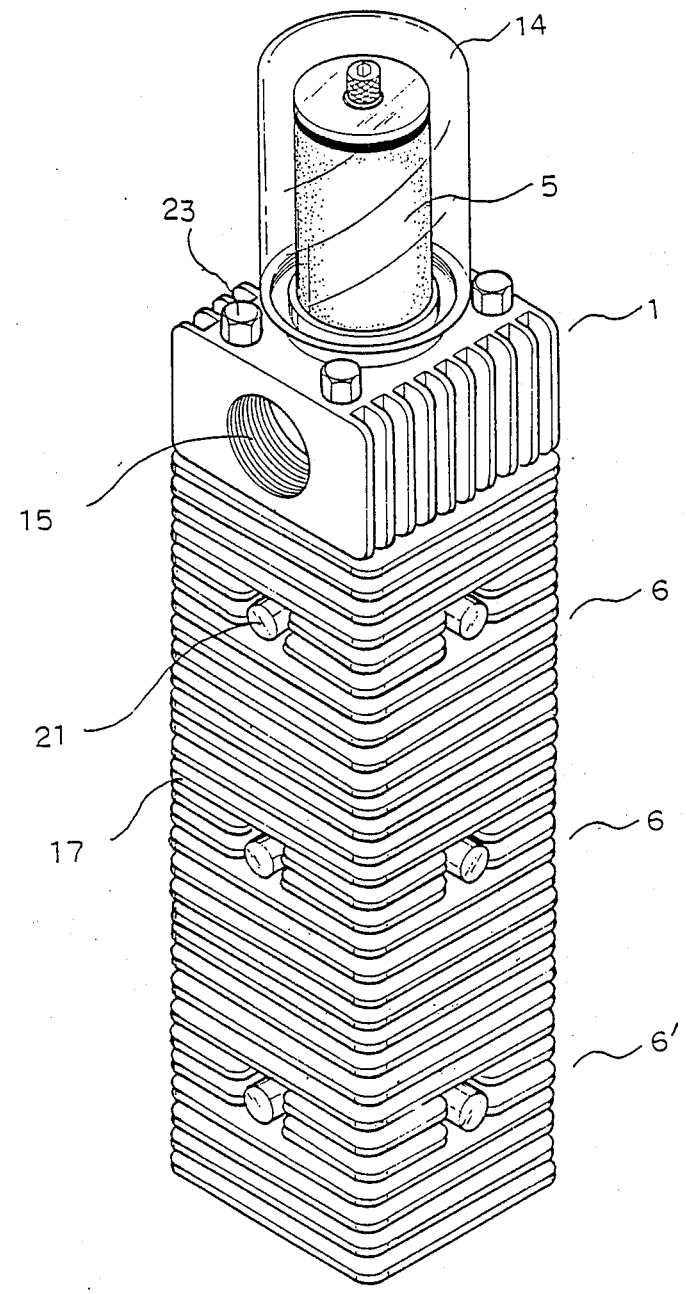
FIG. 2 is an assembly view of the structure of the preferred embodiment.

Referring to FIG. 1, a cooler-dehumidifier-filter 3-in-one apparatus for treating compressed air constructed according to the present invention includes an air inlet-outlet mechanism 1, an air diffusion mechanism 2, an air filtering mechanism 3, an air exhausting device 4, a filter cylinder 5, and a plurality of radiator cisterns 6.

The said inlet-outlet mechanism 1 includes an air inlet 7, an air outlet 15, a L-shaped air intake conduit 8 incorporating said air inlet 7 and having its turning portion downwardly disposed at the center, a bolt hole 9 centrally disposed above said turning portion of said air intake conduit 8, a stepped collar flange 10 upwardly disposed around said bolt hole 9 for fixation thereto of said filter cylinder 5 to let the bottom flange of said filter cylinder 5 be tightly retained with the inner wall of said stepped collar flange 10, wherein an air passage 11 is defined between the downward extension of said stepped collar flange 10 and the outer wall of said air intake conduit 8, and wherein an inner thread 12 tapped collar flange 13 is disposed to surround said stepped collar flange 10 for fixation thereto a glass hood 14 by means of screw joint to cover said filter cylinder 5, and wherein an air conduit 16 is disposed between said collar flange 13 and said stepped collar flange 10 to communicate with said air outlet 15 for induction of the exhausted air from said filter cylinder 5 to said air outlet 15 for further exhausting.

The said radiator cisterns 6 comprises a plurality of radiator fins 17. Except the bottom radiator cistern 6', each said radiator cistern 6 includes a central bore hole having a upwardly disposed collar flange 16 and a downwardly disposed stepped recess 19 such that one radiator cistern is connected with another by means of its collar flange connected with the collar recess of another radiator cistern letting the central bore hole be communicated with one another. Said radiator cisterns 6 also include a plurality of vertically disposed coduits 20 around its circumference. When said radiator cisterns 6 are connected together, said vertically disposed conduits 20 of each radiator cistern are arranged to communicate with the vertically disposed conduits 20 of another radiator cistern respectively. There are also provided a plurality of water inlet (or water outlet) 21 horizontally disposed to communicate with respective conduits 20 wherein each water inlet (or water outlet) 21 is closed while not in use, and is opened while filling or exhaustion of cooling water is required.

Figure 5:
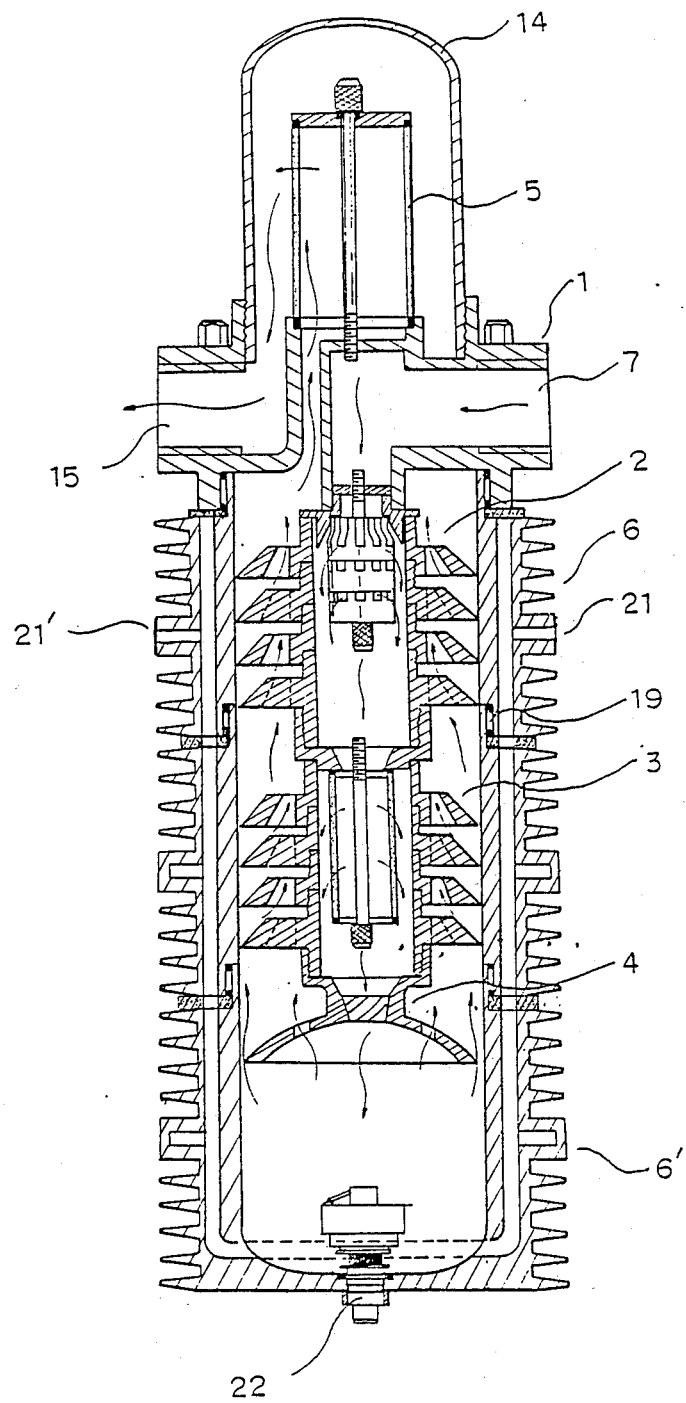
FIG. 5 is a cross-sectional view of the preferred embodiment in application.

The bottom radiator cisterns 6' is constructed according to the structure of other radiator cisterns 6, having an additional drain valve 22 on the bottom for automatic drainage of water, wherein one and more pairs of diametrically spaced vertical conduits 20 are arranged to communicate with respective vertical conduits 20 of said radiator cisterns 6 to respectively form a communicating pipe as shown in FIG. 5. When said radiator cisterns 6 and 6' are well connected, said air inlet-outlet mechanism 1 is firmly attached thereto by means of several fixing rods 23 through respective holes 24, 25 and 26. While in assembly, one or more O-rings are pre-mounted on the upper collar flange 18 of each radiator cistern 6 and 6' to prevent from air leakage, a water sealing gland 27 is provided to block up the top opening of each vertical conduit 20 of said air inlet-outlet mechanism 1, and a ring-shaped washer 28 is provided to set on the top opening of each vertical conduit 20 of each said radiator cistern 6 and 6' to prevent from water leakage.

Figure 3:
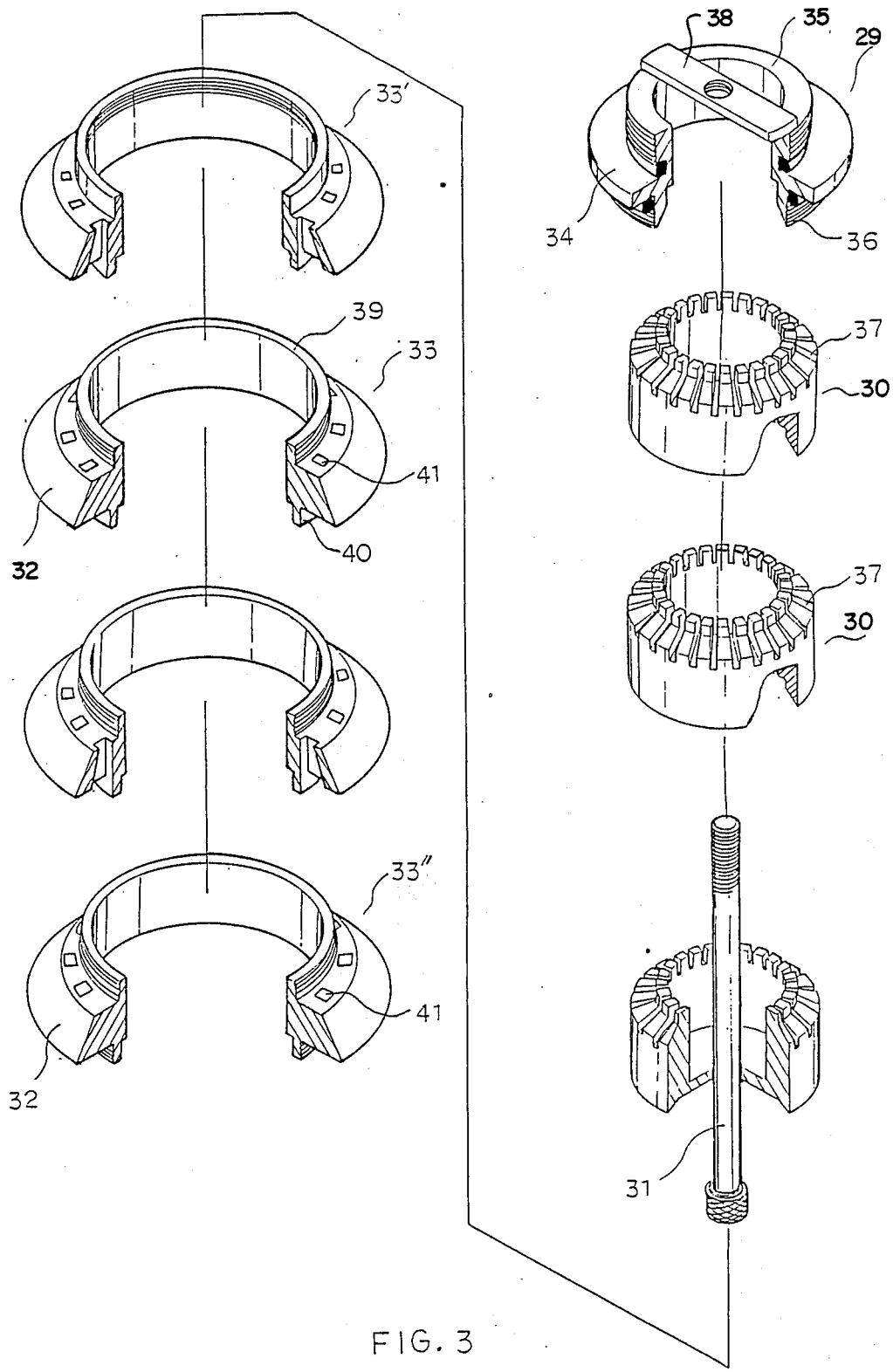
FIG. 3 is a fragmentary perspective view of the air diffusion mechanism of the present invention.

The said air diffusion mechanism 2 is connected to the bottom end of said air intake conduit 8 by means of screw joint and set in the central bore hole of said radiator cisterns 6, of which the structure, as shown in FIG. 3, includes a hollow head portion 29, a plurality of air diffusion elements 30, a fixing rod 31, and a plurality of circular blocks 33 having a radiator flange 32. Said hollow head portion 29 includes a radially disposed flange 34 around the center, an upper out-threaded fixing end 35 and a lower out-threaded fixing end 36 respectively disposed above and below said flange 34 for connection by screw joint with said air intake conduit 8 and said first circular block 33' respectively. Said lower out-threaded fixing end 36 is arranged to provide a slanting inner wall. Said air diffusion elements 30 have a hollow structure, comprising a reduced upper flange and a reduced inner bottom such that the reduced upper flange of one element can be easily connected with the reduced inner bottom of another element, wherein said reduced upper flange includes a radially disposed plurality of air induction slots 37 communicating with the inner wall of said corresponding element at the top end and with the outer wall of said corresponding element at the lower end to match the enclosed bottom of the bottom element 30' so as to let compressed air be induced into the hollow space of said elements 30 and squeezed out of said elements 30 through said induction slots 37 to further be radially diffused outward. When said elements 30 are connected together, they are screwed up with said head portion 29 at the top fixing plate 38 by means of said screw rod 31. Said circular blocks 33 include a radiator flange 32, an outher threaded circular upper end 39 and an inner threaded circular lower end 40 to let the outer threaded circular upper end of one circular block be screwed up with the inner threaded circular lower end of another circular block, while the first top piece of circular block 33' comprises an inner threded top and an inner threaded bottom end for easy connection with said head portion 29 at the top to let the connected elements 30 be disposed inside said circular blocks 33, and the first bottom piece of circular block 33'' comprises an outer threaded top end and an outer threaded bottom end for easy connection with said air filter mechanism 3 at the bottom by means of screw joint, wherein said radiator flanges 32 include a plurality of circumferentially disposed inerlocking holes 41.

Figure 4:
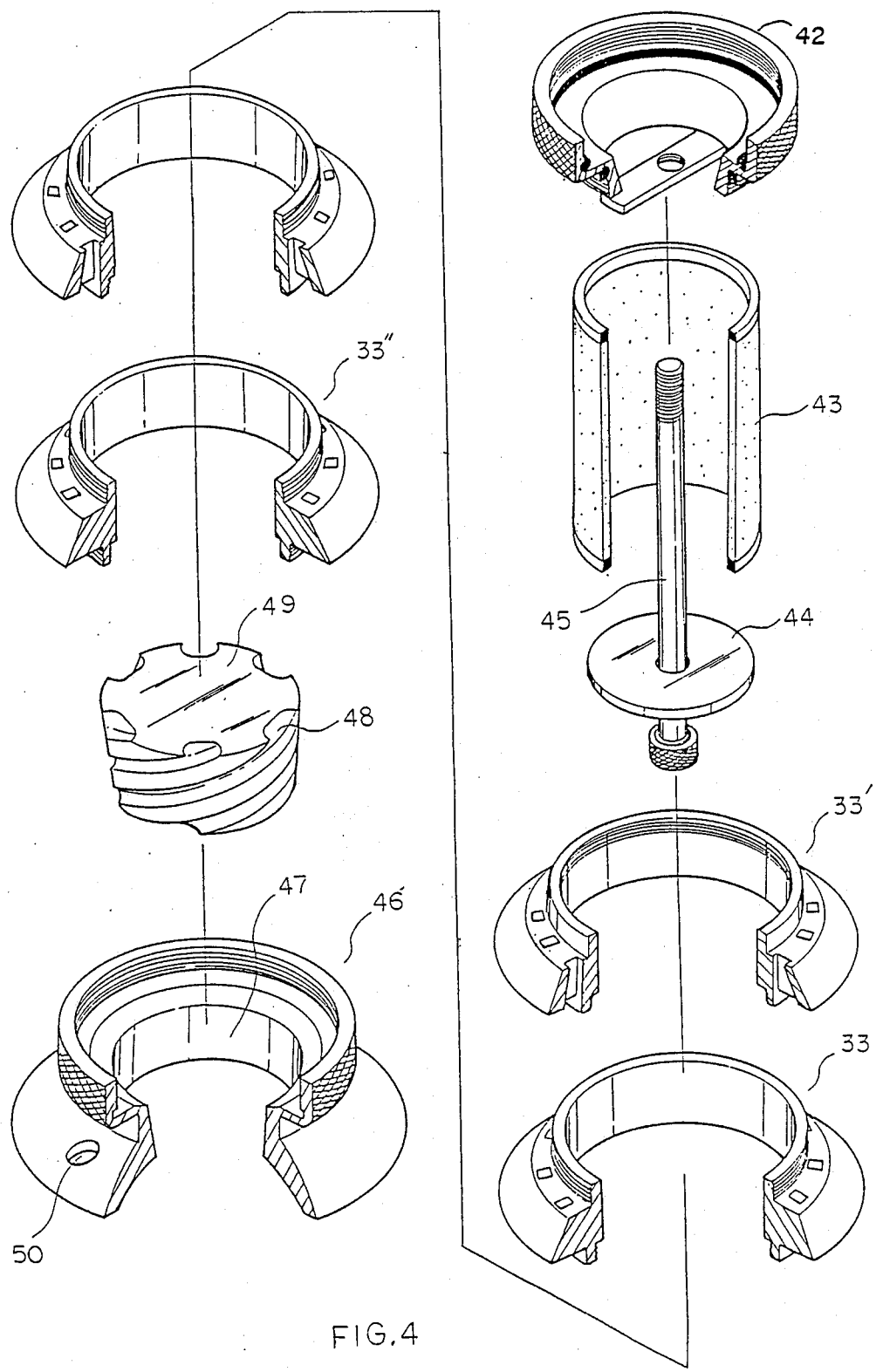
FIG. 4 is a fragmentary perspective view of the air filtering mechanism.

Referring to FIG. 4, the said air filtering mechanism 3 includes an inner threaded head portion 42, a filtering cylinder 43, and a plurality of circular blocks 33 having a structure same as the said circular blocks of said air diffusion mechanism 2, wherein said inner threaded head portion 42 is screwed up with the bottom end of said air diffusion mechanism 2 at the top and connected with said circular blocks 33 at the bottom; said filtering cylinder 43 includes a bottom disc 44 to block up its bottom end and is connected to said head portion 42 at the bottom by means of said screw rod 45 axially penetrating through the central portion of said bottom disc 44 so as to let the diffused air from the upper air diffusion mechanism 2 be initially filtrated through said filtering cylinder 43. There is provided an exhausting device 4 screwed up with the first bottom piece of circular block 33 of said air filtering mechanism 3, comprised of a annular head portion 46 having a horn-shaped bottom end to define an upwardly expanded central hole 47 for setting therein of a cone block 49 having spiral groove 48 on its outer wall, such that the upper air current from said filtering mechanism 3 is exhausted through said exhausting device 4 to form spiral air flow for drying process. Said exhausting device 4 also includes a plurality of piercing holes 50 on its horn-shaped bottom end for the exhausted air to upwardly penetrate therethrough.

Referring to the illustration of the operation of the preferred embodiment as shown in FIG. 5, the hot and moisture contained compressed air exhausted from air compressor is induced through said air inlet 7, said air intake conduit 8 into said air diffusion mechanism 2. Because the bottom end of the series of elements 30 is enclosed, the induced air current is squeezed to diffuse outward through said induction slots 37 to let the compressed air be initially cooled down. The diffused air is further blowing downward through the central hollow space of the series of circular blocks 33. While passing through said filtering cylinder 43 of said filtering mechanism 3, the air current is initially filtrated. The filtrated air is further moving downward to pass through said exhausting device to form into a spiral air flow to blow upon the inner wall of said radiator cisterns 6. While blowing upon the inner wall of said radiator cisterns 6, the air is thus dehumidified, and the moisture separated from air current is accumulated in the central space of the bottom radiator cistern 6'. After a reasonable amount of moisture is accumulated, it will be automatically drained away from said drain valve 22. The dehumidified air is further soaring upward. When the soaring air passes through said filtering mechanism 3 and the interlocking holes 41 of the flange of said air diffusion mechanism 3, it is squeezed and diffused to cool down again. When the air continues to soar to pass through said upwardly disposed filtering cylinder 5, it is filtrated again. The secondarily filtrated air is further exhausted through said air outlet 15 to complete the whole process.

In addition to above-described process, said water inlet 21 and said water outlet 21' of said first top radiator cistern 6 may be pierced for filling of cooling water through said water inlet 21 and draining of the cooling water through said water outlet 21' via the communicating pipe formed by said vertical conduits 20 so as to provide better cooling effect. The cooling water may also help to let the moisture in the compressed air be condensed.

I claim:

1. A cooler-dehumidifier-filter 3-in-one apparatus for treating compressed air comprising an air inlet-outlet mechanism, an air diffusion mechanism, an air filtering mechanism, an air exhausting device, an air filtering cylinder and a plurality of radiator cisterns, wherein said radiator cisterns are vertically connected with one another and set below said air inlet-outlet mechanism, having a centrally disposed bore hole to communicate with one another, the first bottom cistern having an enclosed bottom end and a centrally disposed automatic drain valve on the bottom for drainge of water; said air filtering cylinder being secured with said air inlet-outlet mechanism at the bottom there of and being covered with a glass hood to induce filtrated air from said air filtering cylinder toward the air outlet of said air inlet-outlet mechanism; said air diffusion mechanism, air filtering mechanism and an exhausting device being downwardly connected together in proper order by means of series connection to form an assembly, said assembly being further set in the centrally disposed hollow space of said radiator cisterns and attached to the bottom end of an air intake conduit of said air inlet-outlet mechanism by means of said diffusion mechanism through screw joint; said apparatus being characterized in that a double-cooling effect is achieved by means of the double-squeezing and diffusing process through the arrangement of a plurality of air induction slots made in said air diffusion mechanism and a plurality of interlocking holes made on the flanges of the radiator fins of said air filtering mechanism; an air dehumidifying effect being achieved by means of the formation of spiral air flow through the arrangement of a spiral groove made on the water wall of said exhausting device; a water cooling effect being achieved by means of the arrangement of comunicating pipe formed among said radiator cisterns matching with its water inlet and water outlet.

2. A cooler-dehumidifier-filter 3-in-one apparatus for treating compressed air according as in claim 1, wherein said air diffusion mechanism includes a hollow head portion, a plurality of air diffusion elements, a fixing screw rod and a plurality of circular blocks having a radiator flange; said hollow head portion including a radially disposed flange around the center, an upper out-threaded fixing end and a lower out-threaded fixing end respectively disposed above and below said flange for connection by screw joint with said air intake conduit and said first circular block respectively, and said lower out-threaded fixing end being arranged to provide a slanting inner wall; said air diffusion elements having a hollow structure, comprising a reduced upper flange and a reduced inner bottom, said reduced upper flange including a radially disposed plurality of air induction slots communicating with the inner wall of said corresponding element at the top end and with the outer wall of said corresponding element at the lower end to match the enclosed bottom of the bottom element so as to let compressed air be induced into the hollow space of said elements and squeezed out of said elements through said induction slots to further be radially diffused outward; said elements being connected together and screwed up with the top fixing plate of said head portion by means of a screw rod; said circular blocks including a radiator flange, an inner or outer threaded circular upper end and an inner or outer threaded circular lower end to let said circular blocks be screwed up with one another; at the time said circular blocks being connected together by means of series connection the connected blocks being further attached to said head portion to let the connected elements be disposed inside said circular blocks; a plurality of circumferentially disposed interlocking holes being made on the radiator flanges of said radiator fins.

3. A cooler-dehumidifier-filter 3-in-one apparatus for treating compressed air as in claim 1, wherein said air filtering mechanism includes an inner threaded head portion, a filtering cylinder and a plurality of circular blocks having a structure same as the said circular blocks of said air diffusion mechanism, said inner threaded head portion being screwed up with the bottom end of said air diffusion mechanism at the top and connected with said circular blocks at the bottom; said filtering cylinder including a bottom disc to bolck up its bottom end and being connected to said head portion at the bottom by means of said screw rod axially penetrating through the central portion of said bottom disc so as to let the diffusion air from the upper air diffusison mechanism be initially filtrated through said filtering cylinder.

4. A cooler-dehumidifier-filter 3-in-one apparatus for treating compressed air as in claim 1, wherein said exhausting device being provided to screw up with the first bottom piece of said circular blocks of said air filtering mechanism, comprised of a annular head portion having a horn-shaped bottom end to define an upwardly expanded central hole for setting therein of a cone block having a spiral groove on its outer wall to let the air current from said filtering mechanism be exhausted through said exhausting device to form spiral air flow for drying process; said exhausting device also including a plurality of piercing holes on its horn-shaped bottom end for the exhausted air to upwardly penetrate therethrough.

* * * * *